United States Patent [19]

Nishimura et al.

[11] Patent Number: 4,700,991
[45] Date of Patent: Oct. 20, 1987

[54] VALVE ASSEMBLY FOR BRAKE FLUID PRESSURE CONTROL

[75] Inventors: Takumi Nishimura; Tadao Saito; Nobuyasu Nakanishi; Noboru Noguchi, all of Aichi, Japan

[73] Assignees: Aisin Seiki Kabushiki Kaisha; Toyota Jidosha Kabushiki Kaisha, both of Aichi, Japan

[21] Appl. No.: 820,968

[22] Filed: Jan. 22, 1986

[30] Foreign Application Priority Data

Jan. 23, 1985 [JP] Japan .......................... 60-008174[U]

[51] Int. Cl.$^4$ .............................................. B60T 8/42
[52] U.S. Cl. .................................... 303/113; 303/116
[58] Field of Search ................. 303/6 C, 92, 113, 115, 303/116, 117, 119

[56] References Cited

U.S. PATENT DOCUMENTS

| 3,813,130 | 5/1974 | Inada ..................................... 303/115 |
| 4,027,924 | 6/1977 | Kondo ............................. 303/115 X |
| 4,116,495 | 9/1978 | Belart ..................................... 303/115 |
| 4,218,100 | 8/1980 | Kervogoret ..................... 303/116 X |

Primary Examiner—Duane A. Reger
Attorney, Agent, or Firm—Burns, Doane, Swecker & Mathis

[57] ABSTRACT

A brake fluid pressure control valve assembly includes a body having a single cylinder bore communicating inlet and outlet ports connected to a brake master cylinder and wheel brake cylinder, respectively. The cylinder bore accommodates the components of two separate valves, namely first, second and third seat members and first and second valve elements brought into and out of contact with seat surfaces of these seat members, as well as a spring interposed between the two valve bodies, a pressure reducing piston and a by-pass piston. First and second passageways arranged in parallel each interconnect the inlet and outlet ports through two serially arranged valve cavities in the cylinder bore and are opened and closed in a prescribed manner by the two valves in cooperation with the spring and pistons. The third seat member has seal rings fitted in first and second annular grooves formed in its outer periphery for providing a seal between the outer periphery of the third seat member and wall surfaces of axially extending bores in the first and second seat members. The diameter of first and second end portions outwardly of the first and second annular grooves, respectively, of the third seat member is such that these end portions will not contact the wall surfaces of the axially extending bores of the first and second seat members, respectively.

18 Claims, 5 Drawing Figures

Fig.1

VALVE ASSEMBLY FOR BRAKE FLUID PRESSURE CONTROL

BACKGROUND OF THE INVENTION

This invention relates to a valve assembly for brake fluid pressure control in an automotive vehicle and, more particularly, to a brake fluid pressure control valve assembly used in an anti-skid control apparatus.

As well-known in the art, an anti-skid control apparatus operates by sensing the premonitory symptoms of wheel lock-up when a brake is applied, interrupting hydraulic pressure by a cut-off valve, which is arranged between the brake master cylinder and wheel brake cylinder, upon detection of such symptoms, and increasing the volume of a hydraulic circuit on the wheel brake cylinder side to reduce the brake fluid pressure of the wheel brake cylinder, thereby causing a decline in wheel braking force. When the tendency of the wheels to lock has thus been mitigated, the apparatus decreases the volume of the hydraulic circuit on the wheel brake cylinder side to raise the brake fluid pressure, thereby increasing the wheel braking force.

In an anti-skid control apparatus of this kind, there is the danger that the cut-off valve will close accidentally due to a failure in the valve opening mechanism, as a result of which brake fluid pressure would be incapable of being supplied from the brake master cylinder to the wheel brake cylinder, thereby making braking impossible. An arrangement for alleviating this danger has been proposed in, for example, the specification of Japanese Patent Kokai-Publication No. 58-199258, in which a by-pass valve which opens in response to a failure in the cut-off valve opening mechanism is arranged in parallel with the cut-off valve.

OBJECTS AND SUMMARY OF THE DISCLOSURE

The arrangement disclosed in the above-cited specification includes a body having an inlet port connected with the brake master cylinder and an outlet port connected with the wheel brake cylinder. The body is provided with a parallel arrangement of first and second cylinder bores respectively communicating with the inlet and outlet ports. Incorporated in one of the cylinder bores is the cut-off valve and a pressure reducing piston for opening and closing the cut-off valve, and incorporated in the other cylinder bore is the by-pass valve. With this arrangement, it is necessary that the body be provided with the two cylinder bores and with passageways for connecting the cylinder bores. It is also required that the cut-off valve components, namely a seat member, valve element and spring, as well as the pressure reducing piston, be incorporated in one of the cylinder bores and that the bore be closed by a closure member. Likewise, it is required that the by-pass valve components, namely a pair of seat members, a valve element and spring, as well as the by-pass piston, be incorporated in the other cylinder bore and that this bore also be closed by a closure member. The unfortunate result is not only a body which is large in size but also poor productivity stemming from the many man-hours required for machining and assembly.

Accordingly, an object of the present invention is to provide a novel brake fluid pressure control valve assembly which solves the aforementioned problems encountered in the prior art by incorporating two valves, which are equivalent to the above mentioned cut-off vlave and by-pass valve, in only a single cylinder bore formed in the body.

Another object of the present invention is to provide a brake fluid pressure control valve assembly of far fewer component parts, easier assembly and reliable sealing between components.

According to the present invention, the foregoing objects are attained by providing a brake fluid pressure control valve assembly comprising: a body having an inlet port connected to the brake master cylinder, an outlet port connected to the wheel brake cylinder, and a cylinder bore communicating the inlet and outlet ports;

a first seat member having an axially extending bore and a seat surface and fitted securely in the cylinder bore in sealed relation with respect to a wall surface of the cylinder bore;

a second seat member having an axially extending bore and a seat surface and fitted securely in the cylinder bore in sealed relation with respect to the wall surface of the cylinder bore and adjacent to said first seat member;

a third seat member having a seat surface, a first end portion securely fitted into the bore of said first seat member and a second end portion securely fitted into the bore of said second seat member for forming first and second valve chambers inside said first and second seat members, respectively;

first and second valve elements accommodated in said first and second valve chambers, respectively;

first and second passageway means arranged in parallel each for connecting the inlet port to the outlet port through the first and second valve chambers in succession;

spring means for bringing the first valve element into contact with the seat surface of said first seat member to cut off said first passageway means, and for separating the second valve element from the seat surface of said third seat member to open said second passageway means and bringing said second valve element into contact with the seat surface of said second seat member for cutting off said first passageway means;

a pressure reducing piston for separating the first valve element from the seat surface of said first seat member against said spring means; and a by-pass piston for separating the second valve element from the seat surface of said second seat member and bringing said second valve element into contact with the seat surface of said third seat member against said spring means;

said third seat member having first and second annular grooves formed in its outer periphery and fitted with seal rings for providing a seal between the outer periphery of said third seat member and wall surfaces of the axially extending bores of said first and second seat members, respectively;

the first and second end portions outwardly of said first and second annular grooves, respectively, of said third seat member having an outer diameter which will provide clearance between said first and second end portions and the wall surfaces of the axially extending bores of said first and second seat members, respectively.

Namely, the diameter of the first and second end portions outwardly of the first and second annular grooves, respectively, of the third seat member is such that the first and second end portions will not contact the wall surfaces of the axially extending bores of the first and second seat members, respectively.

Thus, the valve assembly of the present invention having the foregoing construction has a single cylinder bore accommodating the components of two valves, namely the first seat member, second seat member, third seat member, first and second valve elements, as well as the spring, pressure reducing piston and by-pass piston. This arrangement eliminates the need for a passageway formed in the body of the conventional valve assembly in order to connect the two cylinder bores. In addition, the body of the valve assembly of the present invention is smaller than that of the prior art, and only a single closure member is needed to close the opening of the single cylinder bore, thereby reducing the number of component parts and making assembly easier. In particular, since the components of the two valves are integrated by forcively (e.g., press) fitting the third seat member into the axially extending bores of the first and second seat members, the assembly operation is greatly facilitated.

Though the foregoing advantages can be obtained by adopting a configuration in which the inner circumferential surfaces of the first and second seat members and the outer circumferential surface of the third seat member define a cylinder of a uniform diameter over the entire length of these surfaces, such a configuration would result in the inner circumferential surfaces of the first and second seat members being scratched by the third seat member at the stage of the assembly operation where the third seat member is press fitted into the first and second seat members. Since the seal rings fitted into the annular grooves of the third seat member would then slide on and remain in contact with these scratched surfaces when the device is in the assembled state, the end result would be a poor seal between the outer circumferential surface of the third seal member and the inner circumferential surfaces of the first and second seal members. In accordance with the present invention, however, the outer diameter of the first and second end portions of the third seal member outboard of the first and second annular grooves is set to a value which will not allow these end portions to contact the inner circumferential surfaces of the first and second seat members. At the step where the third seat member is (with its central portion being press fitted) press fitted into the first and second seat members, therefore, no scratches are formed on the inner circumferential surfaces of the first and second seat members on which the seal rings slide and where they are contacted by the seal rings when the device is in the assembled state. This assures that an improper seal will not occur. The inner circumferential surfaces of the first and second seat members where they are contacted by the seal rings can also be prevented from being scratched at the press-fitting step by using a third seat member having a uniform outer diameter and forming the first and second seat members to include inner circumferential surfaces of stepped cylindrical shape in such a manner that the entrances to these first and second seat members will be of a diameter larger than the outer diameter of the third seat member. With such an expedient, however, a gap will be formed on the non-hydraulic pressure side of the seal rings when the valve is assembled, and it is likely that the seal rings will be damaged by bulging into these gaps due to the high hydraulic pressure produced at braking. According to the present invention, however, a gap is formed on the hydraulic pressure side of the seal rings and not on the non-hydraulic pressure side thereof, so there is no risk of seal ring damage caused by the action of hydraulic pressure.

BRIEF DESCRIPTION OF THE DRAWINGS

FIG. 1 is a view showing a system incorporating a preferred embodiment of a brake fluid pressure control valve according to the present invention.

DESCRIPTION OF THE PREFERRED EMBODIMENTS

Figure 1:
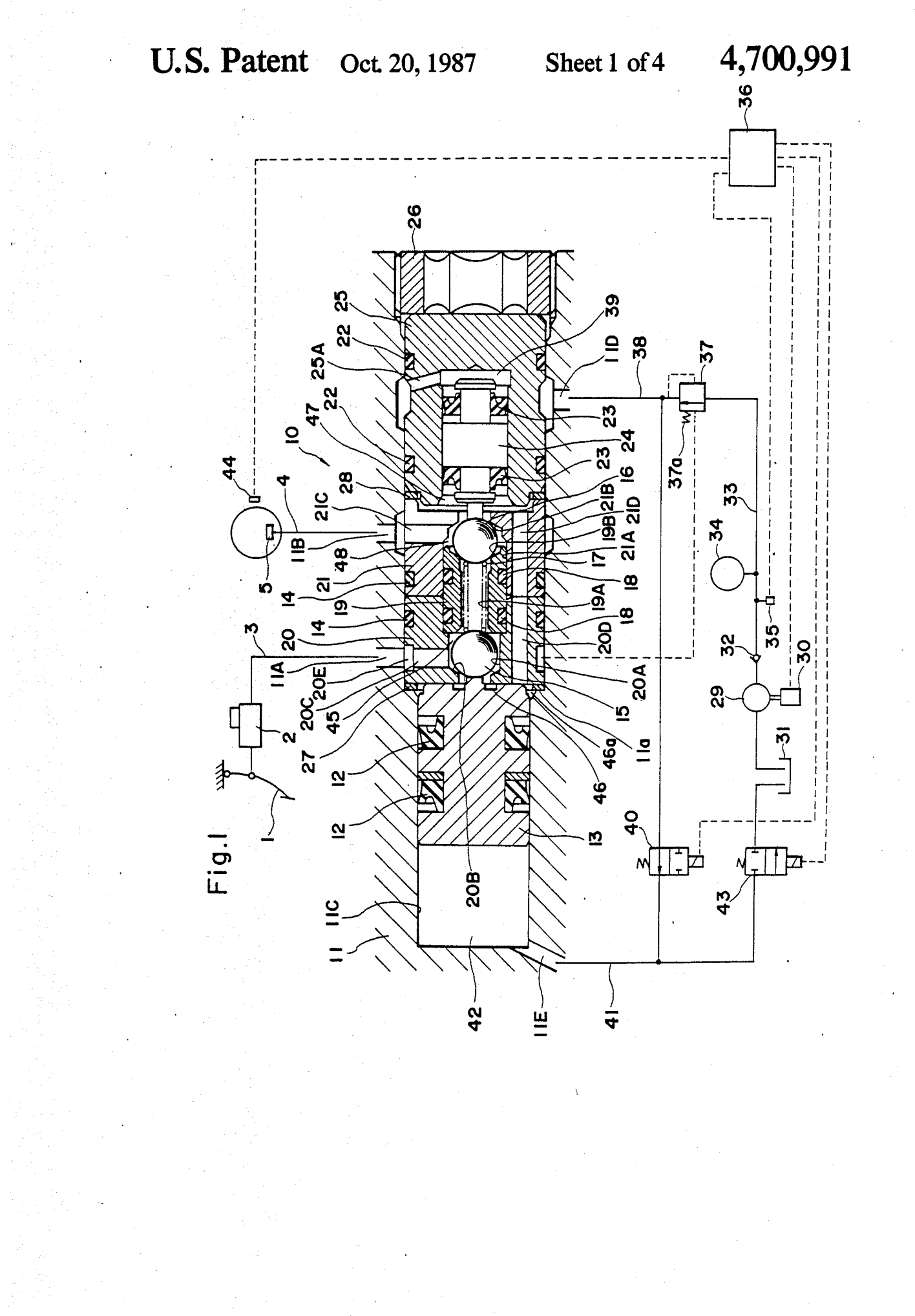
Figure 2:
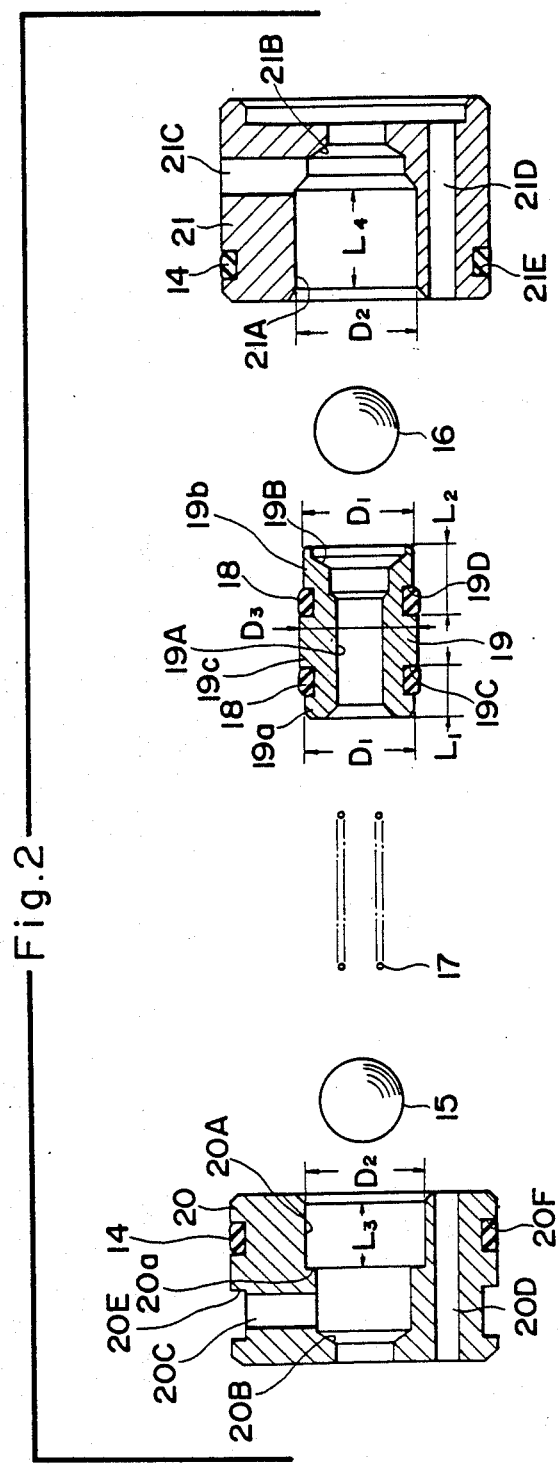
FIG. 2 is an exploded view, parts of which are shown in section, illustrating a principle portion of the valve assembly depicted in FIG. 1.

A preferred embodiment of the present invention will now be described with reference to the drawings. FIG. 1 illustrates a system incorporating a brake fluid pressure control valve assembly in accordance with the present invention. The system includes a brake pedal 1 and a brake master cylinder 2 operatively associated therewith. Pressing down on the brake pedal 1 actuates the brake master cylinder 2, which responds by supplying a hydraulic circuit 3 with hydraulic pressure commensurate with the amount of foot pressure applied to the brake pedal 1. The hydraulic pressure in the hydraulic pressure circuit 3 is supplied to a wheel brake cylinder 5 by a hydraulic circuit 4 through a brake fluid pressure control valve assembly 10 in accordance with the present invention.

The valve assembly 10 has a body 11 which includes an inlet port 11A, an outlet port 11B and cylinder bore 11C. A pressure reducing piston 13 equipped with ring-shaped cup seals 12 mounted in respective annular grooves formed in the outer periphery of the piston is fitted into the left end portion of cylinder bore 11C and is slidable along the inner wall surface of the bore while a tight seal is maintained between the inner wall surface and the piston by virtue of the seals 12. Fitted securely into the central portion of the cylinder bore 11C and maintained in tight sealing contact with its inner wall surface are first and second seat members 20, 21. Formed on the outer periphery of these first and second seat members 20, 21 are respective annular grooves 20F, 21E (FIG. 2) each fitted with a sealing ring 14. The first and second seating members 20, 21 interiorly accommodate first and second valve bodies 15, 16, respectively, a spring 17 interposed between these valve bodies, and a third seat member 19 having annular grooves 19C, 19D on its outer periphery. Fitted securely into the right end portion of the cylinder bore 11C and maintained in tight sealing contact with its inner wall surface is a closure member 25. Formed on the outer periphery of the closure member 25 are two annular grooves each fitted with a seal ring 22. A by-pass piston 24 fitted with two ring-shaped cup seals 23 is sealingly and slidably fitted into the closure member 25.

To secure the seat members 20, 21 and the closure member 25 against movement, the body 11 is provided with a step portion 11a and an annular member 26 is screwed into an opening at the extreme right end of the cylinder bore 11, thereby tightly securing the seat members 20, 21 and the closure member 25 in the cylinder bore 11 between the step portion 11a and the annular member 26, with gaskets 27, 28 being interposed between the step portion 11a and first, seat member 20 and between the second seat member 21 and closure member 25, respectively.

The assembly comprising the seat members 19, 20, 21, the valve bodies 15, 16, the spring 17 and the seal rings 14, 18 will now be described in greater detail.

The first seat member 20 has an axially extending bore 20A, a seat surface 20B, passages 20C, 20D, and an annular groove 20E. Likewise, the second seat member 21 has an axially extending bore 21A, a seat surface 21B and passage 21C, 21D. The third seat member 19 has a passage 19A and a seat surface 19B. The third seat member 19 has end portions 19a, 19b outboard of its annular grooves 19C, 19D, respectively. These end portions 19a, 19b have an outer diameter $D_1$ set to be smaller than the diameter $D_2$ of a press-fitting portion formed in each of the axial bores 20A, 21A of the first and second seat members 20, 21. The third seat member 19 has a central portion 19c whose outer diameter $D_3$ is greater than $D_2$. Lengths $L_1$, $L_2$ from this central portion to the end portions of the third seat member 19 are smaller than lengths $L_3$, $L_4$ of the press-fitting portions of axial bores 20A, 21A, respectively. To assemble these members, which are best seen in the exploded view of FIG. 2, the first step is to insert the first valve element 15 and the spring 17 in the axially extending bore 20A of first seat member 20. Next, the left end of the third seal member 19 fitted with the seal rings 18 is press fitted into the axially extending bore 20A until the left end face of the seat member abuts against the step portion 20a. This is followed by inserting the second valve element 16 into the axially extending bore 21A of second seat member 21. The second seat member 21 is then press fitted onto the other end of the third seal member 19 until it abuts against the first seat member 20. In press fitting the second seat member 21 onto the third seat member 19, a pin (not shown) serving as jig is passed through the passages 20D, 21D to bring them into proper linear registration and is then withdrawn after the press-fitting operation. Accordingly, those portions of the inner wall surfaces of the axially extending bores 20A, 21A along which the seal rings 18 are slid during the press-fitting step, and which are contacted by the seal rings 18 when the device is in the assembled state, are maintained in a flaw-free condition and a reliable seat is obtained between the outer periphery of the third member 19 and the inner periphery of the first and second seat members 20, 21.

The annular groove 20E, passage 20C, a valve chamber 45, pressure reducing chamber 46a, passage 20D, 21D, a chamber 47, a valve chamber 48 and the passage 21C define a first passageway interconnecting the input port 11A and output port 11B. The annular groove 20E, passage 20C, the valve chamber 45, the passage 19A, the valve chamber 48 and the passage 21c define a second passageway.

In FIG. 1, a hydraulic pump 29 is actuated by a motor 30 to draw in a working fluid from a reservoir 31 and discharge the fluid into a hydraulic circuit 33 through a check valve 32. A pressure accumulator 34 and a pressure-sensitive switch 35 are connected to the hydraulic circuit 33. The pressure-sensitive switch 35 and motor 30 are connected to an electronic control unit 36. The latter responds to a signal from the pressure-sensitive switch 35 by operating the motor 30 in such a manner that hydraulic pressure internally of the pressure accumulator 34 resides within a prescribed range necessary for the operation of the valve assembly. Hydraulic pressure from the pressure accumulator 34 is supplied by the hydraulic circuit 33 to a hydraulic circuit 38 via a regulator valve 37. During non-application of the brake, the regulator valve 37 supplies the hydraulic circuit 38 with a hydraulic pressure set by a spring. When the brake is applied, the regulator valve 37 supplies the hydraulic circuit 38 with a hydraulic pressure proportional to and greater than a hydraulic pressure generated by the brake master cylinder 2. The hydraulic pressure in the hydraulic circuit 38 is supplied from a port 11D in body 11 to a chamber 39 on the right side of the by-pass piston 24 through a passageway 25A in the closure member 25. The hydraulic pressure causes the by-pass piston 24 to separate the second valve element 16 from the seat surface 21B and bring the valve element 16 into contact with the seat surface 19B. The hydraulic pressure in the hydraulic circuit 38 is also supplied from a port 11E in body 11 to a chamber 42 on the left side of the pressure reducing piston 13 through a normally-open solenoid valve 40 and a hydraulic circuit 41, thereby causing the pressure reducing piston 13 to separate the first valve element 15 from the seat surface 20B. The hydraulic circuit 41 is connected to the reservoir 31 through a normally-closed solenoid valve 43. The two solenoid valves 40, 43 are connected to the electronic control unit 36 which, when the brake is applied, controls the operation of the solenoid valves 40, 43 based on a signal from a wheel rotation sensor 44.

FIG. 1 shows the state of the valve assembly when the vehicle is traveling. Specifically, the pressure reducing piston 13 keeps the first valve element 15 separated from the seat surface 20B of the first seat member 20, and the by-pass piston 24 keeps the second valve element 16 separated from the seat surface 21B of the second seat member 21 and in contact with the seat surface 19B of the third seat member 19. Accordingly, when the driver steps down on the brake pedal 1 to stop the vehicle, the hydraulic pressure produced by the brake master cylinder 2 is fed into the wheel brake cylinder 5 through the hydraulic circuit 3, inlet port 11A, annular groove 20E, passage 20C, valve chamber 45, pressure reducing chamber 46, 46a passage 20D, passage 21D, chamber 47, valve chamber 48, passage 21C, outlet port 11B and hydraulic circuit 4, whereby braking is applied to the wheels to brake the vehicle.

The rotating state of the wheels at braking is sensed by the sensor 44, which produces a corresponding signal applied to the electronic control unit 36. On the basis of this signal, the electronic control unit 36 checks for the premonitory symptoms of wheel locking and, when such symptoms are detected, closes the solenoid valve 40 and opens the solenoid valve 43. As a result, hydraulic pressure in chamber 42 on the left side of the pressure reducing piston 13 decreases so that the pressure reducing piston 13 is slid toward the chamber 42 by the hydraulic pressure in the pressure reducing chamber 46. At the beginning of the sliding stroke of pressure reducing piston 13, the first valve element 15 is brought into contact with the seat surface 20B by the spring 17 so that the hydraulic circuit on the wheel cylinder side extending from the pressure reducing chamber 46 to the wheel brake cylinder 5 is interrupted, after which the sliding of the pressure reducing piston 13 increases the volume of the hydraulic circuit on the oil brake cylinder side to lower the brake fluid pressure of the wheel brake cylinder 5, thereby decreasing the braking force acting on the wheels.

As a result of the foregoing operation, the rotational velocity of the wheels increases and is sensed by the sensor 44, which produces a corresponding signal. When the electronic control unit 36 detects on the basis of this signal that the danger of wheel locking no longer exists, the control unit restores the solenoid valves 40, 43 to their original states so that the chamber 42 on the left side of the pressure reducing piston 13 is again supplied with hydraulic pressure from the hydraulic circuit 38, whereby the piston 13 is slid back toward its original position to decrease the volume of the hydraulic circuit on the wheel brake cylinder side, thus elevating the brake fluid pressure in the wheel brake cylinder 5 to increase the braking force applied to the wheels. When the symptoms of wheel locking are not detected during the time that the pressure reducing piston 13 is returning to its original position, the piston 13 is allowed to return to the original position to separate the first valve element 15 from the seat surface 20B.

In the event that a prescribed hydraulic pressure is no longer supplied to the hydraulic circuit 38 owing to, say, failure of the hydraulic pressure pump 29, the second valve element 16 is forcibly separated from the seat surface 19B of the third seat member 19 and brought into contact with the seat surface 21B of the second seat member 21 by the spring 17. When the brake pedal 1 is depressed, therefore, the pressure reducing piston 13 is slid leftward by the hydraulic pressure form the brake master cylinder 2, thereby allowing the first valve element 15 to contact the seat surface 20B. Though hydraulic pressure now can no longer be supplied to the wheel brake cylinder 5 through the pressure reducing chamber 46, the action of the second valve element 16 permits hydraulic pressure from the brake master cylinder 2 to be fed into the wheel brake cylinder 5 through the vavle chamber 45, passage 19A and valve chamber 48, as a result of which braking is applied to the wheels. Since the second valve element 16 is in contact with the seat surface 21B at this time to cut off the pressure reducing chamber 46 and the chamber 47 from the wheel brake cylinder 5, a phenomenon wherein the brake fluid flows into the pressure reducing chamber 46 and chamber 47 to increase the brake pedal stroke cannot occur.

Figure 3:
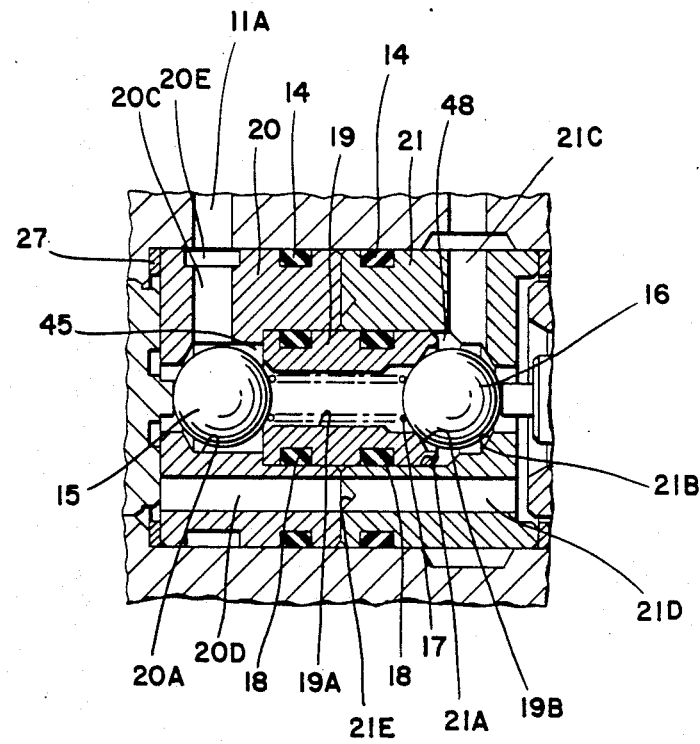
FIG. 3 is a partial view of another embodiment of the present invention
Figure 4B:
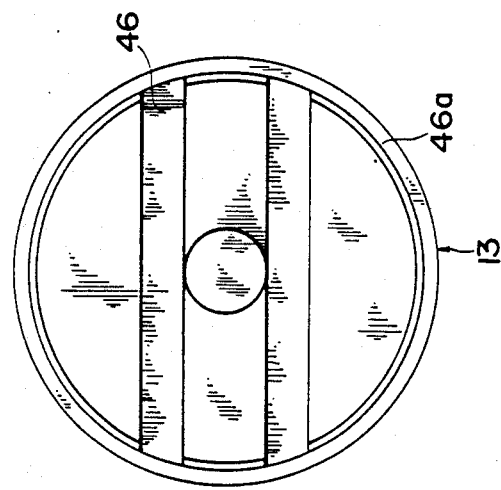
FIG. 4B is a front view of the pressure reducing piston employed in the present invention.
Figure 4A:
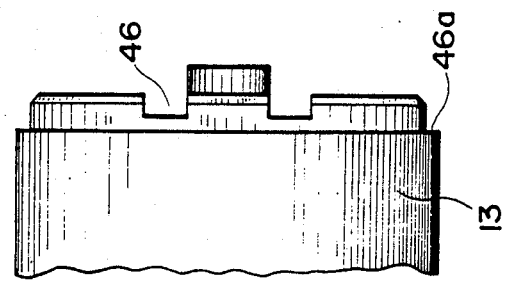
FIG. 4A is a side view of the pressure reducing piston employed in the present invention.

As many apparently widely different embodiments of the present invention can be made without departing from the spirit and scope thereof, it is to be understood that the invention is not limited to the specific embodiments thereof except as defined in the appended claims. For example, though the two valve elements 15, 16 are urged by the single spring 17 in the illustrated embodiment, an arrangement can be adopted in which these valve elements are acted upon by separate springs. Further, in the illustrated embodiment, communication is established between the passages 20D, 21D by positioning these passages linearly when the seat members 19, 20, 21 are press fitted. However, it is possible for the passages 20D, 21D to be brought into communication by forming an annular groove 21E in one of the opposing side faces of the seat members 20, 21, the radius of the annular groove being the distance from central axis of the seat members to the passages 20D, 21D. This will make it possible to delete the positioning step (FIG. 3).

Thus, according to the present invention as described hereinabove, there is provided a brake fluid pressure control valve assembly which, in comparison with the prior art, has a body 11 of smaller size, fewer component parts and greater ease of assembly. There is also no risk of seal failure.

What is claimed is:

1. A valve assembly for brake fluid pressure control in a system having a brake master cylinder and a wheel brake cylinder, comprising:
   a body having an inlet port connected to the brake master cylinder, an outlet port connected to the wheel brake cylinder, and a cylinder bore communicating the inlet and outlet ports;
   a first seat member having an axially extending bore and a seat surface and fitted securely in the cylinder bore in sealed relation with respect to a wall surface of the cylinder bore;
   a second seat member having an axially extending bore and a seat surface and fitted securely in the cylinder bore in sealed relation with respect to the wall surface of the cylinder bore and adjacent to said first seat member;
   a third seat member having a seat surface, a first end portion securely fitted into the bore of said first seat member and a second end portion securely fitted into the bore of said second seat member for forming first and second valve chambers inside said first and second seat members, respectively;
   first and second valve elements accommodated in said first and second valve chambers, respectively;
   first and second passageway means arranged in parallel each for connecting the inlet port to the outlet port through the first and second valve chambers in succession;
   spring means for bringing the first valve element into contact with the seat surface of said first seat member to cut off said first passageway means, and for separating the second valve element from the seat surface of said third seat member to open said second passageway means and bringing said second valve element into contact with the seat surface of said second seat member for cutting off said first passageway means;
   a pressure reducing piston for separating the first valve element from the seat surface of said first seat member against said spring means; and
   a by-pass piston for separating the second valve element from the seat surface of said second seat member and bringing said second valve element into contact with the seat surface of said third seat member against said spring means;
   said third seat member having first and second annular grooves formed in its outer periphery and fitted with seal rings for providing a seal between the outer periphery of said third seat member and wall surfaces of the axially extending bores of said first and second seat members, respectively;
   the first and second end portions outwardly of said first and second annular grooves, respectively, of said third seat member having an outer diameter which will provide clearance between said first and second end portions and the wall surfaces of the axially extending bores of said first and second seat members, respectively.

2. A valve assembly for brake fluid pressure control as defined in claim 1, wherein said first and second passageway means are provided within the first and second seat members, and the third seat member, respectively.

3. A valve assembly for brake fluid pressure control as defined in claim 1, wherein said first seat member has an axially extending passage to constitute the first passage.

4. A valve assembly for brake fluid pressure control as defined in claim 1, wherein said second seat member has an axially extending passage to constitute the first passage.

5. A valve assembly for brake fluid perssure control as defined in claim 1, wherein said third seat member has an axial passage to constitute the second passageway communicating the both ends of the third seat member.

6. A valve assembly for brake fluid pressure control as defined in claim 1, wherein said third seat member has end portions outboard of said grooves having an outer diameter set to be smaller than the diameter of a corresponding fitting portion formed in each of the axial bores of the first and second seat members, respectively.

7. A valve assembly for brake fluid pressure control as defined in claim 1, wherein said third seat member has a central portion whose outer diameter is greater than the diameter of corresponding fitting portions of the first and second seat members.

8. A valve assembly for brake fluid pressure control as defined in claim 6, wherein said third seat member has a central portion whose outer diameter is greater than the diameter of corresponding fitting portions of the first and second seat members.

9. A valve assembly for brake fluid pressure control as defined in claim 5, wherein said spring means is disposed within the axial passage of the third seat member.

10. A valve assembly for brake fluid pressure control as defined in claim 2, wherein said first passageway is defined by the first valve chamber of the first seat member, a pressure reducing chamber of the pressure reducing piston, a first chamber of a closure member for the by-pass piston, and the second valve chamber of the second seat member.

11. A valve assembly for brake fluid pressure control as defined in claim 5, wherein said second passageway is defined by the first valve chamber of the first seat member, the axial passage of the third seat member and the second valve chamber of the second seat member.

12. A valve assembly for brake fluid pressure control as defined in claim 1, which further includes a hydraulic pressure source, a regulator valve which supplies the by-pass piston and the pressure reducing piston with a regulated hydraulic pressure.

13. A valve assembly for brake fluid pressure control as defined in claim 12, wherein the regulated hydraulic pressure from the regulator valve is supplied to a by-pass piston second chamber disposed on the opposite side of the by-pass piston to the second valve chamber.

14. A valve assembly for brake fluid pressure control as defined in claim 13, wherein said regulator valve provides a regulated hydraulic pressure which, when the brake is applied, produces a hydraulic pressure proportional to and greater than a hydraulic pressure generated by the brake master cylinder.

15. A valve assembly for brake pressure control as defined in claim 12, wherein said regulated hydraulic pressure is supplied to a chamber on the opposite side of the pressure reducing piston to the first valve chamber through solenoid valve means.

16. A valve assembly for brake fluid pressure control as defined in claim 14, wherein said opposite chamber of the pressure reducing piston is selectively connectable via solenoid valve means to an exhaust port.

17. A valve assembly for brake fluid pressure control as defined in claim 15, wherein said solenoid valve means is connected to an electronic control unit which controls the operation of the solenoid valve means in response to a signal from a wheel rotation sensor.

18. A valve assembly for brake fluid pressure control as defined in claim 1, wherein one of said first and second seat members has an annular passage in the opposing side faces to each other, said annular passage communicating both axial passages of the seat members.

* * * * *